United States Patent [19]
Weber

[11] 3,833,850

[45] Sept. 3, 1974

[54] SYSTEM FOR TRANSFORMING A PHYSICAL PARAMETER INTO AN ELECTRICAL SIGNAL

[76] Inventor: Günther Weber, 2209 Sushorn, Sushorn, Germany

[22] Filed: Aug. 29, 1973

[21] Appl. No.: 392,460

[30] Foreign Application Priority Data
Aug. 29, 1972 Germany.............................. 2242490

[52] U.S. Cl.................... 324/41, 328/5, 340/248 D, 340/258 C
[51] Int. Cl............................................ G01r 33/00
[58] Field of Search ................ 324/40, 41; 307/308; 328/5; 331/65; 340/248 A, 248 D, 258 B, 258 C

[56] References Cited
UNITED STATES PATENTS

| | | | |
|---|---|---|---|
| 3,598,968 | 8/1971 | Victor................................ | 331/65 X |
| 3,761,803 | 9/1973 | Slough ............................... | 331/65 X |

*Primary Examiner*—Stanley T. Krawczewicz
*Attorney, Agent, or Firm*—Karl F. Ross; Herbert Dubno

[57] ABSTRACT

A system for converting a physical parameter, e.g. the proximity of a metal body to a proximity-responsive indicator, into an electrical signal (evaluation or plotting signal) comprises the aforementioned indicator whose output is supplied to a feedback control circuit and the control circuit has a regulated-value signal which is supplied to an evaluation circuit. The evaluation circuit includes a storage device or memory (e.g. a capacitor establishing the threshold of the evaluation circuit) to which the reference signal is supplied from the indicator and control circuit so that subsequent deviations from the reference value will produce an output independent of the nature and size of the body.

5 Claims, 1 Drawing Figure

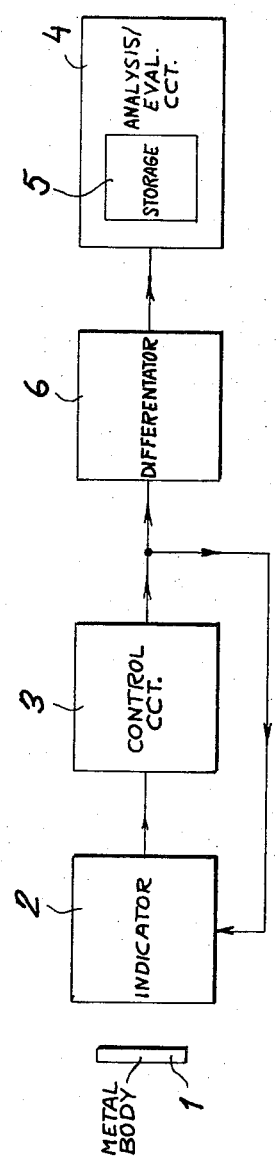

SYSTEM FOR TRANSFORMING A PHYSICAL PARAMETER INTO AN ELECTRICAL SIGNAL

FIELD OF THE INVENTION

The present invention relates to a system for transforming a physical parameter into an electrical output or evaluation (plotting) signal and, more particularly, to improvements in such systems so as to render them self-adaptive to a given situation.

BACKGROUND OF THE INVENTION

It is common practice in dealing with physical parameters or values to convert them, for evaluation or plotting, into electrical signals. For this purpose a sensor, detector or indicator responsive to the physical parameter is provided in the form of a physical/electrical transducer whose output signal may be further processed.

For example, where the indicator has a continuous output which is modified by the physical action, a regulator or control circuit may be provided and can be connected in a feedback loop to control the output signal which is eventually delivered to an evaluating or analysis circuit, e.g. through a differentiator or other signal-processing network designed to render the system more rapidly responsive to changes in the physical parameter. The analysis or evaluation circuit may be a comparator to which a reference signal is applied so that passage of the output-signal input to the evaluation or analysis circuit above a threshold determined by the reference value or signal or below a threshold determined by the reference value or signal will result in the ultimate output, e.g. an evaluation or plotting signal which may operate other electrical or electronic devices. For example, the evaluation signal may be applied to a plotter or other display module, may operate an alarm or warning circuit or may simply be registered upon a signal-storage medium.

The reference value or signal is usually set by hand and may be in the form of a variable resistor of a SCHMITT-trigger threshold circuit or the like.

Circuit arrangements or converting a physical parameter into an electrical signal include, for example, systems in which the physical parameter is the spacing between a metal body and an indicator circuit responsive to the proximity thereof. Such devices are disclosed in U.S. Pat. Nos. 3,747,010 and 3,747,012 and German Auslegeschrift Pat. No. 1,951,137.

Circuit arrangements of this type use an oscillator as the indicator and the significant output value of the indicator is the amplitude of the oscillations of the oscillator and the amplitude may be regulated by a control circuit in a feedback loop as described in German Auslegeschrift Pat. No. 2,052,989. The oscillator circuit responds by damping in the presence of the metal body and, even when the normal oscillation mode is held substantially constant by a feedback control circuit, the system is responsive to other variables than the proximity of the metal part. For example, the system responds to the nature of the material and the size of the metal part as well. In other words, the system will respond to the approach of a metal part to a predetermined distance from the indicator, as established by a preset threshold value or reference input, only when the metal parts or bodies are of the same size and/or of the same material. When different materials or bodies of different sizes are to effect the response, the distance at which the system will respond varies for a given setting of the threshold or reference values.

OBJECT OF THE INVENTION

It is the principal object of the present invention to provide a system for converting a physical parameter into an electrical signal whereby the aforementioned disadvantages are avoided and extraneous influences on the response of the system are excluded.

SUMMARY OF THE INVENTION

This object and others which will become apparent hereinafter are attained, in accordance with the present invention, in a system of the general type described wherein, however, a storage element (memory) is provided to store the output for the indicator and its control circuit as a reference value or input for the evaluation or analysis circuit.

According to the invention, therefore, the evaluation or analysis circuit includes a storage element, e.g. a capacitor connected across the reference terminals of the threshold input of a SCHMITT trigger or other threshold circuit, in which the output signal of the indicator and control circuit is stored at an initial response of the circuit as the reference signal for further operation of the device.

While conventional circuits are characterized in that the individual threshold states are defined by dimensioning of the circuit elements or the manual introduction of a reference value, the circuit according to the invention is adapted or capable of "learning" the reference values during operation and with the initial operation.

The response of the circuit according to the present invention thus is not only independent of the extraneous factors mentioned above (i.e., the size and material of the body) but is responsive only to the particular parameter which it is desired to detect. The system is thus able to "learn" and is self-adaptive in the sense that the latter term has been employed in the control art. The circuit may be used for a particular physical parameter with actuators of different dimensions and composition and a circuit of components of particular dimensions and configuration can be used for detection of the physical parameter in many circumstances since only with the initial response is the threshold criteria learned and stored.

DESCRIPTION OF THE DRAWING

The above and other objects, features and advantages of the present invention will become more readily apparent from the following description reference being made to the accompanying drawing in which the sole FIGURE is a block diagram illustrating the invention.

SPECIFIC DESCRIPTION

In the drawing, I have shown a circuit for the conversion of a physical parameter into an electrical signal, the circuit comprising an indicator 2 responsive to the physical parameter, e.g. the proximity of a metal body 1. The indicator 2 can be an oscillator (U.S. Pat. Nos. 3,747,010 and 3,747,012 and German Pat. No. 1,951,137) provided with a feedback control circuit 3 (German Auslegeschrift Pat. No. 2,052,989 and German Offenlegungsschrift Pat. No. 1,952,679) connected in a feedback path to the oscillator to control the significant output value, i.e., the oscillation amplitude of the oscillator.

The output from these circuit elements is applied to an evaluation or analysis circuit 4 (e.g. a comparator or a threshold circuit of the SCHMITT-trigger type as described in U.S. Pat. Nos. 3,741,426 or 3,686,461) provided with a storage element 5 for the reference signal. The storage element may be a capacitor bridged across the reference-value input terminals of the SCHMITT-trigger threshold circuits of the latter patents. Evaluation and analysis circuits of the type described in German Auslegeschrift Pat. No. 2,052,989 and Offenlegungsschrift Pat. No. 1,952,679 may, of course, also be used with suitable incorporation of a storage element 5.

A differentiator 6 may be provided between the output of the indicator/control circuit 2, 3 and the evaluation or analysis circuit 4 and a suitable differentiator network can be that described at pages 38 – 42 of PULSE, DIGITAL AND SWITCHING WAVEFORMS, McGraw Hill Book Co., 1965.

When the metal body 1 is brought close to the indicator 2 so that the desired spacing is developed between them, the output applied to the evaluation and analysis circuit constitutes a reference signal which is stored in element 5 to establish the threshold value. During the initial operation of the device, therefore, the system learns its reference value only with the initial operation. Thereafter, the threshold circuit will respond to deviations above or below this threshold value, as required, substantially independently of the dimensioning and configuration of the circuit, and independently of the material and size of the actuating member 1. The initial position of body 1 thus establishes the switching distance independently of the material or size of this body. With the same component dimensioning and settings, therefore, the circuit may be used for a variety of different purposes since only with the initial response is the threshold criteria learned. The differentiator 6 has the advantage that the evaluation and analysis signal 4 can produce a first signal with a positive differential of the regulated output from the indicator/control circuit 2, 3 and an inverse signal with a negative differential. Similarly, the system can respond only to the succession of a negative differential or a positive differential or vice versa and equal absolute signal levels.

I claim:

1. A system for transforming a physical parameter into an electrical signal comprising an indicator responsive to a physical value and producing an output signal; a control circuit connected to said indicator for controlling the same in response to said output signal; an evaluation/analysis circuit receiving said output signal for comparing it with a reference value and producing an evaluated signal in response to such comparison; and storage means responsive to an initial output signal from said indicator for applying same to said evaluation/analysis circuit as said reference value.

2. The system defined in claim 1, further comprising the differentiator for said output signal between said control circuit and said evaluation/analysis circuit.

3. The system defined in claim 2 wherein said evaluation and analysis circuit is so constructed and arranged so that the evaluated signals produced thereby are inverses of one another upon receipt of a positive differential and a negative differential output signal respectively from said differentiator.

4. The system defined in claim 2 wherein said evaluation/analysis circuit is so constructed and arranged that it produces said evaluated signal only upon receipt of a negative differential followed by a positive differential output signal from said differentiator and the absolute values of the two differentials are equal.

5. The system defined in claim 1 wherein said indicator is an oscillator and said physical parameter is the proximity of a metal part from said oscillator.

* * * * *